United States Patent [19]

Rozycki

[11] Patent Number: 4,801,162
[45] Date of Patent: Jan. 31, 1989

[54] INTEGRAL STRAIN RELIEF FOR FLUIDIC DEVICES

[75] Inventor: Stanley J. Rozycki, Roselle, Ill.

[73] Assignee: Honeywell Inc., Minneapolis, Minn.

[21] Appl. No.: 14,106

[22] Filed: Jan. 30, 1987

Related U.S. Application Data

[63] Continuation of Ser. No. 257,077, Apr. 24, 1981, abandoned.

[51] Int. Cl.⁴ ............................................. F16L 35/00
[52] U.S. Cl. ................................. 285/115; 285/158; 285/331; 285/423
[58] Field of Search ............... 285/115, 331, 423, 116, 285/114, 158, 242

[56] References Cited

U.S. PATENT DOCUMENTS

| | | |
|---|---|---|
| 684,582 | 10/1901 | McGuire . |
| 805,579 | 11/1905 | Patchen . |
| 1,044,013 | 11/1912 | Burnett ............................... 285/116 |
| 1,156,145 | 10/1915 | Jenkins . |
| 1,310,627 | 7/1919 | McEvilly . |
| 1,367,246 | 2/1921 | Ewald . |
| 1,816,008 | 2/1930 | Folds . |
| 1,836,986 | 12/1931 | Paasche ............................... 285/114 |
| 1,970,050 | 8/1934 | Mathey . |
| 2,054,307 | 9/1936 | Taylor . |
| 2,295,830 | 9/1942 | Carlson ............................... 285/115 |
| 2,434,219 | 1/1948 | Morrison ......................... 285/423 X |
| 2,470,359 | 5/1949 | McLean .......................... 285/423 X |
| 2,580,818 | 1/1952 | Mundy et al. .................. 285/115 X |
| 2,864,378 | 12/1958 | Schneller et al. . |
| 2,880,722 | 4/1959 | Dickinson, Jr. ..................... 285/242 |
| 3,121,577 | 2/1964 | Merriman ........................ 285/242 X |
| 3,164,400 | 1/1965 | Weaver . |
| 3,493,251 | 2/1970 | Kramer ............................. 285/331 X |
| 3,512,805 | 5/1970 | Glatz ................................. 285/331 X |
| 3,516,691 | 6/1970 | Williams et al. ................. 285/242 X |
| 3,659,880 | 5/1972 | Goldsobel ........................ 285/423 X |
| 4,052,990 | 10/1977 | Dodgson .......................... 285/331 X |

FOREIGN PATENT DOCUMENTS

| | | | |
|---|---|---|---|
| 808066 | 3/1969 | Canada ............................... 285/114 |
| 1263653 | 5/1961 | France ................................ 285/114 |
| 417265 | 1/1967 | Switzerland ....................... 285/331 |

Primary Examiner—Thomas F. Callaghan
Attorney, Agent, or Firm—Donald J. Lenkszus

[57] ABSTRACT

A fluidic device housing having strain relief including an integral connector for receiving a fluid carrying tube and an integral strain relief for relieving strain on the integral connector which may be caused by the fluidic carrying tube.

12 Claims, 1 Drawing Sheet

U.S. Patent
Jan. 31, 1989
4,801,162
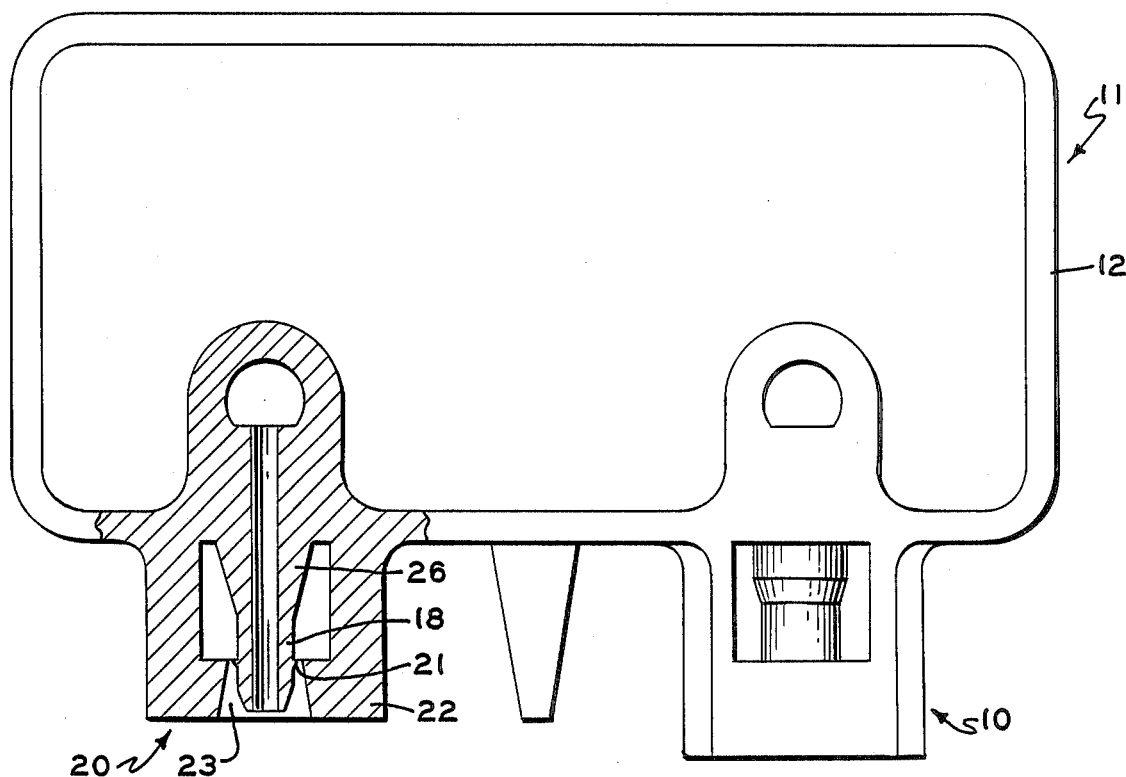
FIG. 1
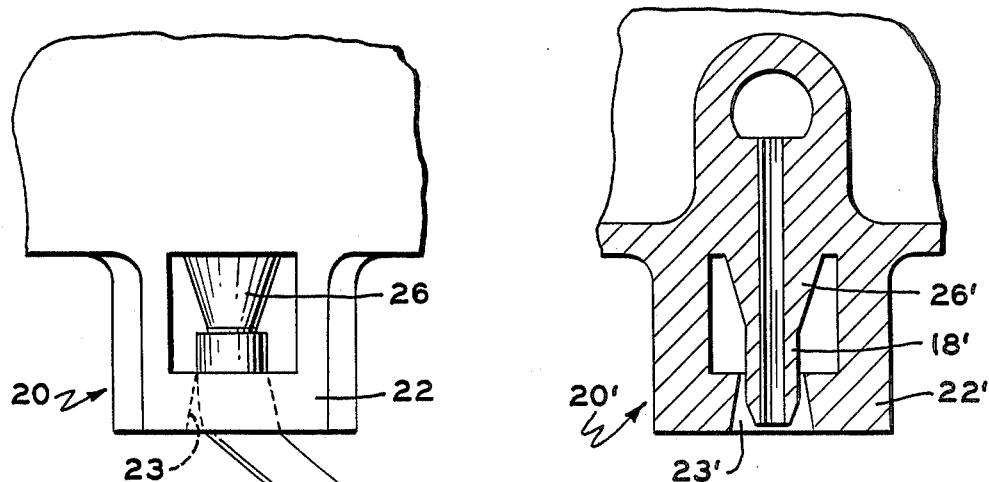
FIG. 3
FIG. 2

INTEGRAL STRAIN RELIEF FOR FLUIDIC DEVICES

This application is a continuation of application Ser. No. 257,077, filed Apr. 24, 1981, and now abandoned.

BACKGROUND OF THE INVENTION

The present invention relates to fluidic device housings having integral strain relief. This invention is particularly useful in protecting the male connectors of the plastic housings used for pneumatic devices.

Typical pneumatic systems are comprised of one or more pneumatic devices having molded plastic housings. The housings have male connectors to receive plastic pneumatic tubing so that sources of main pressure, pneumatic control signals and pneumatic output signals can be connected to and from the pneumatic devices. A typical male connector for receiving a pneumatic tube has a barb extending circumferentially around the connector to retain the pneumatic tube on the male connector against accidental removal.

Since the pneumatic device housing is molded out of plastic, however, male connectors have been broken off of such housings when the pneumatic tube has applied sufficient lateral forces against the connector. The present invention is directed to an integral strain relief for protecting the connectors of fluidic devices. In the example of the pneumatic device having a male connector as given above, the integral strain relief may be in the form of a ring which surrounds the male connector and is integrally molded, extruded or otherwise with the plastic housing to take the forces off of the male connectors as may otherwise be exerted on the male connectors by the plastic pneumatic tubing which fits over the male connector.

SUMMARY OF THE INVENTION

Thus, the invention is directed to a fluidic device housing having integral strain relief including an integral connector for receiving a fluid carrying tube and an integral strain relief mechanism for relieving strain on the integral connector which may be caused by the fluid carrying tube.

BRIEF DESCRIPTION OF THE DRAWINGS

These and other features and advantages will become more apparent from a detailed consideration of the invention when taken in conjunction with the drawings in which:

FIG. 1 shows a fluidic device housing having a strain relief for protecting the typical male connector;

FIG. 2 is a drawing showing an alternative strain relief mechanism; and,

FIG. 3 shows how the strain relief mechanism protects the typical male connector from lateral forces exerted on it by typical pneumatic tubing.

DETAILED DESCRIPTION

As shown in FIG. 1, pneumatic device 11 has housing 12 with nozzle and strain relief arrangements 10 and 20 for supplying pneumatic pressure to pneumatic device 11 and for deriving a control or other type of signal therefrom. More or fewer such arrangements may, of course, be used. Fluidic device 11 may be a pneumatic device and housing 12 may be a molded plastic housing. Similarly, nozzle and strain relief arrangements 10 and 20 are integrally molded with housing 12. Nozzle and strain relief arrangement 20 is shown in more detail and comprises nozzle or connector 18 having barb 21 extending circumferentially therearound. Strain relief 22 surrounds nozzle 18 and provides access 23 so that a plastic pneumatic tube can be inserted over nozzle 18 and retained thereon by barb 21. Male connector 18 is thus inserted into the pneumatic tube which is pushed through access 23 of strain relief 22 a sufficient distance for barb 21 to retain the tube on male connector 18. As shown in FIG. 1, male connector 18 is flared at 26 to act as a stop when the pneumatic tube is inserted over male connector 18 through access 23.

FIG. 3 shows that when the pneumatic tubing connected to male connector 18 is pulled to the side, strain relief 22 relieves the lateral force from male connector 18. Thus, male connector 18 is protected from breakage by strain relief 22.

An alternative construction is shown in FIG. 2 wherein the barb 21 has been eliminated and access 23 has been reduced in size. Thus, a compression fitting is formed when the fluidic carrying or pneumatic tube is pushed through access 23' and onto nozzle 18'. That is, since the clearance of access 23 is reduced in size, the pneumatic tube is squeezed between strain relief 22 and male connector 18 compressing pneumatic tube therebetween. Barb 21 is no longer needed and the device is simplified. Strain relief 22' still provides strain relief for male connector 18'.

The embodiments of the invention in which an exclusive property or right is claimed are defined as follows:

1. A fluidic device, comprising:
    a fluidic housing having a wall, said housing forming at least part of a fluidic device which substantially encloses on all sides a volume within the device;
    integral connector means for receiving a fluid carrying tube, said integral connector means being integrally formed with said wall and standing away from said wall, said integral connector means comprising an aperture for passing a fluid through said wall, said aperture having a size which is small in comparison to the size of said wall;
    integral strain relief means integrally formed with said wall for relieving strain which may be applicable to said integral connector means by the fluid carrying tube; and
    said wall, said integral connector means, and said integral strain relief means forming a unitary, molded construction.

2. The device of claim 1 wherein said integral connector means comprises a male connector integrally formed with said wall.

3. The device of claim 2 wherein said male connector has a barb extending circumferentially therearound to retain the fluid carrying tube thereon.

4. The device of claim 3 wherein said integral strain relief means comprises an access ring at least partially surrounding said male connector and having an access through which the fluid carrying tube can be inserted over said male connector, said access ring being integrally formed with said wall.

5. The device of claim 2 wherein said integral strain relief means comprises an access ring at least partially surrounding said male connector and having an access through which the fluid carrying tube can be inserted over said male connector in a compression fitting, said access ring being integrally formed with said wall.

6. The device of claim 2 wherein said integral strain relief means comprises an access ring at least partially surrounding said connector means and having an access through which the fluid carrying tube can be inserted over said connector means, said access ring being integrally formed with said wall.

7. The device of claim 2 wherein said integral strain relief means comprises an access ring at least partially surrounding said connector means and having an access through which the fluid carrying tube can be inserted over said connector means in a compression fitting, said access ring being integrally formed with said wall.

8. A pneumatic plastic housing, comprising:
a wall forming at least part of a fluidic device which substantially encloses on all sides a volume within the device;
a male connector for receiving a pneumatic tube, said male connector being integrally formed with said wall and standing away from said wall, said male connector comprising an aperture for passing a pneumatic signal through said wall, said aperture having a size which is small in comparison to the size of said wall; and,
a strain relief ring integrally formed with said wall and at least partially surrounding said male connector, said strain relief ring having an access for allowing the pneumatic tube to be inserted in a first direction over said male connector, said ring relieving strain resulting from forces lateral to said first direction which may be applied to said integral male connector by the pneumatic tube,
said male connector, said strain relief ring, and said wall forming a unitary, molded construction.

9. The housing of claim 8 wherein said integral ring has an access dimensioned with respect to said male connector for forming a compression fitting to hold the pneumatic tube upon said male connector.

10. A fluidic device comprising:
a fluidic housing having a wall;
a connector for receiving a fluidic tube, said connector being integrally formed on said wall and comprising an aperture for passing a fluid through said wall, said aperture having a size which is small in comparison to the size of said wall, said connector receiving said tube in a first axial direction;
strain relief means for preventing said tube from applying forces to said connector in a direction lateral to said first axial direction; and wherein
said wall, said connector and said strain relief means are integrally formed in a one piece molded plastic construction.

11. A fluidic device in accordance with claim 10 wherein:
said connector comprises at least one barb integrally formed thereon and extending circumferentially therearound to retain said tube thereon.

12. A fluidic device in accordance with claim 11 wherein:
said strain relief means comprises an access ring through which said tube can be inserted over said connector, said access ring being disposed in relationship with said connector such that forces exerted by said tube in directions lateral to said first axial direction are relieved by said access ring.

* * * * *